(12) United States Patent
Yano et al.

(10) Patent No.: US 8,910,769 B2
(45) Date of Patent: Dec. 16, 2014

(54) LUBRICATING STRUCTURE OF TRANSMISSION

(71) Applicant: Honda Motor Co., Ltd, Tokyo (JP)

(72) Inventors: Keita Yano, Saitama (JP); Shoji Machida, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 116 days.

(21) Appl. No.: 13/733,590

(22) Filed: Jan. 3, 2013

(65) Prior Publication Data
US 2013/0213757 A1  Aug. 22, 2013

(30) Foreign Application Priority Data

Feb. 21, 2012  (JP) ................... 2012-035624

(51) Int. Cl.
*F16D 13/74* (2006.01)
*F16H 3/00* (2006.01)
*F16H 3/093* (2006.01)

(52) U.S. Cl.
CPC ............. *F16D 13/74* (2013.01); *F16H 3/006* (2013.01); *F16H 2003/0938* (2013.01); *F16H 2200/006* (2013.01)
USPC .................... 192/113.5; 192/85.61

(58) Field of Classification Search
CPC .......... F16D 2065/788; F16D 2300/06; F16D 2300/0214
USPC ........................................ 192/113.5
See application file for complete search history.

(56) References Cited

U.S. PATENT DOCUMENTS

| 5,651,288 A * | 7/1997 | Meeusen ................... 74/333 |
| 2008/0099306 A1* | 5/2008 | Tsukada et al. ............ 192/82 R |
| 2011/0233024 A1* | 9/2011 | Fujimoto et al. .......... 192/85.01 |

FOREIGN PATENT DOCUMENTS

JP   2001-050301 A   2/2001

* cited by examiner

*Primary Examiner* — Rodney H Bonck
(74) *Attorney, Agent, or Firm* — Westerman, Hattori, Daniels & Adrian, LLP

(57) ABSTRACT

A lubricating structure of a transmission is capable of supplying a lubricating oil with respect to a clutch promptly and stably. The lubricating structure of the transmission includes a first oil passage 53 which extends in a second input shaft 18 from one end side thereof to a first position, and the lubricating oil is supplied from the one end side, a second oil passage 54 which connects to the first oil passage 53 at the first position and extends in the second input shaft 18 to a second position, a first lubrication hole 55 which distributes the lubricating oil to the second clutch 20 at the first position, and a second lubrication hole 56 which distributes the lubricating oil to a transmission mechanism 40 at the second position.

3 Claims, 2 Drawing Sheets

LUBRICATING STRUCTURE OF TRANSMISSION

BACKGROUND OF THE INVENTION

1. Field of the Invention

The present invention relates to a lubricating structure of a transmission which supplies a lubricating oil from an input shaft within the transmission.

2. Description of the Related Art

There has conventionally been known a lubricating structure adapted to supply a lubricating oil, in a structure in which an input member side of a clutch having the input member and an output member is fixed to an input shaft in a transmission, to a canceller chamber and a clutch plate of the clutch, via an oil passage within the input shaft. For example, in Japanese Patent Laid-Open No. 2001-50301, a structure in which the lubricating oil is supplied to the canceller chamber of the clutch via the oil passage provided in the input shaft, and a hydraulic oil of the clutch is supplied via another oil passage provided to the input shaft, is disclosed.

Further, the oil passage inside the input shaft for supplying the lubricating oil to the clutch is used for supplying the lubricating oil via a lubrication hole provided in the input shaft, also to members arranged around the input shaft. The members arranged around the input shaft includes, for example, a transmission mechanism such as a bearing which rotatably supports a gear and the like about the input shaft, its gear, and a synchromesh mechanism and the like.

However, in the case where the lubricating oil is supplied via the oil passage in the input shaft to the mechanism existing around the input shaft halfway of the oil passage, and to the clutch positioned near the terminal end thereof, a distribution amount of the lubricating oil distributed via lubrication holes provided to the positions corresponding thereto varies upon receiving influence of a revolving speed of the input shaft.

That is, in the case where the revolving speed is fast, large amount of lubricating oil flows out from the lubrication hole on an upstream side, and in the case where the revolving speed is slow, an opposite phenomenon occurs. Therefore, the supply amount of the lubricating oil with respect to the clutch varies by the revolving speed of the input shaft, so that a problem that the stable supply of the lubricating oil to the clutch is impaired, or a filling of the lubricating oil into the canceller chamber is delayed, occurs.

In order to avoid this, it is conceivable to supply the lubricating oil from an end portion on the side where the clutch exists to the oil passage of the input shaft. However, in the case where a hydraulic pump for supplying the lubricating oil is provided on a side opposite to the clutch of the transmission, it becomes necessary to separately provide a long oil passage from the hydraulic pump to a case portion near the end portion of the input shaft on the clutch side, leading to increase in the length or weight of the transmission.

SUMMARY OF THE INVENTION

In view of the limitation now present in the prior art, an object of the present invention is to provide a lubricating structure of a transmission capable of promptly and stably supplying a lubricating oil to a clutch.

A lubricating structure of a transmission in accordance with the present invention includes: an input shaft which is input with a motive power from a prime mover; a transmission mechanism provided rotatably and concentric to the input shaft; a clutch which is capable of freely switching between an engagement mode in which the motive power input to the input shaft to the transmission mechanism is transmitted, and a disengagement mode in which the transmission is shut off; a first oil passage extending in the input shaft from one end thereof to a first position corresponding to a position of the clutch, and which is supplied with the lubricating oil; a second oil passage extending in the input shaft from the first position to a second position corresponding to a position of the transmission mechanism; and a connecting oil passage which connects the first oil passage and the second oil passage at the first position, wherein the input shaft is provided with a first lubrication hole which pierces an inner circumferential surface of the first oil passage to an outer peripheral surface of the input shaft for distributing the lubricating oil to the clutch at the first position, and a second lubrication hole which pierces an inner circumferential surface of the second oil passage to an outer peripheral surface of the input shaft for distributing the lubricating oil to the transmission mechanism at the second position.

In this configuration, the lubricating oil supplied to the first oil passage directly flows to the first position corresponding to the position of the clutch, and is distributed to the canceller chamber of the clutch or other portions of the clutch, at the first position from the first lubrication hole. And, the residual thereof is distributed to the transmission mechanism from the second lubrication hole positioned at the second position in the second oil passage.

As such, the lubricating oil does not flow out to other portions until the lubricating oil reaches the first lubrication hole, so that constantly stable amount is directly distributed from the first lubricating hole to the clutch. By doing so, it becomes possible to promptly fill the canceller chamber of the clutch with the lubricating oil, and to supply the lubricating oil stably to the friction-engagement element and the like of the clutch.

Further, no opening such as a lubrication hole exists on the first oil passage until reaching the clutch, so that the running out of the lubricating oil in the case where the transmission is left unattended may be suppressed.

In the present invention, the lubricating structure includes an intermediate shaft arranged to the outer peripheral side of the input shaft, and which is provided rotatably and concentric to the input shaft, wherein the transmission mechanism is arranged on the intermediate shaft, the supply of the lubricating oil to the first oil passage is performed from a case of the transmission to the prime mover side of the first oil passage, an input member of the clutch is arranged on an end portion of another end side of the input shaft, an end portion of the prime mover side of an output member of the clutch is fixed to an end portion of the clutch side of the intermediate shaft, and the transmission mechanism is arranged on the intermediate shaft from the fixed portion with the output member to the prime mover side thereof.

Further, in the present invention, the case is equipped with a first case coupled to the prime mover, and a second case coupled to the first case and which accommodates the transmission mechanism, wherein the input shaft and the output shaft are supported by the second case so that the prime mover sides of the input shaft and the output shaft face the first case side, and the supply of the lubricating oil to the first oil passage is performed from the first case.

According thereto, the lubricating oil may be supplied to the first oil passage from the hydraulic pump provided in the first case without passing the second case. Therefore, it becomes possible to shorten the overall length of the transmission, and to shorten the oil path until the clutch and to simplify the lubricating structure.

DESCRIPTION OF THE PREFERRED EMBODIMENTS

Figure 1:
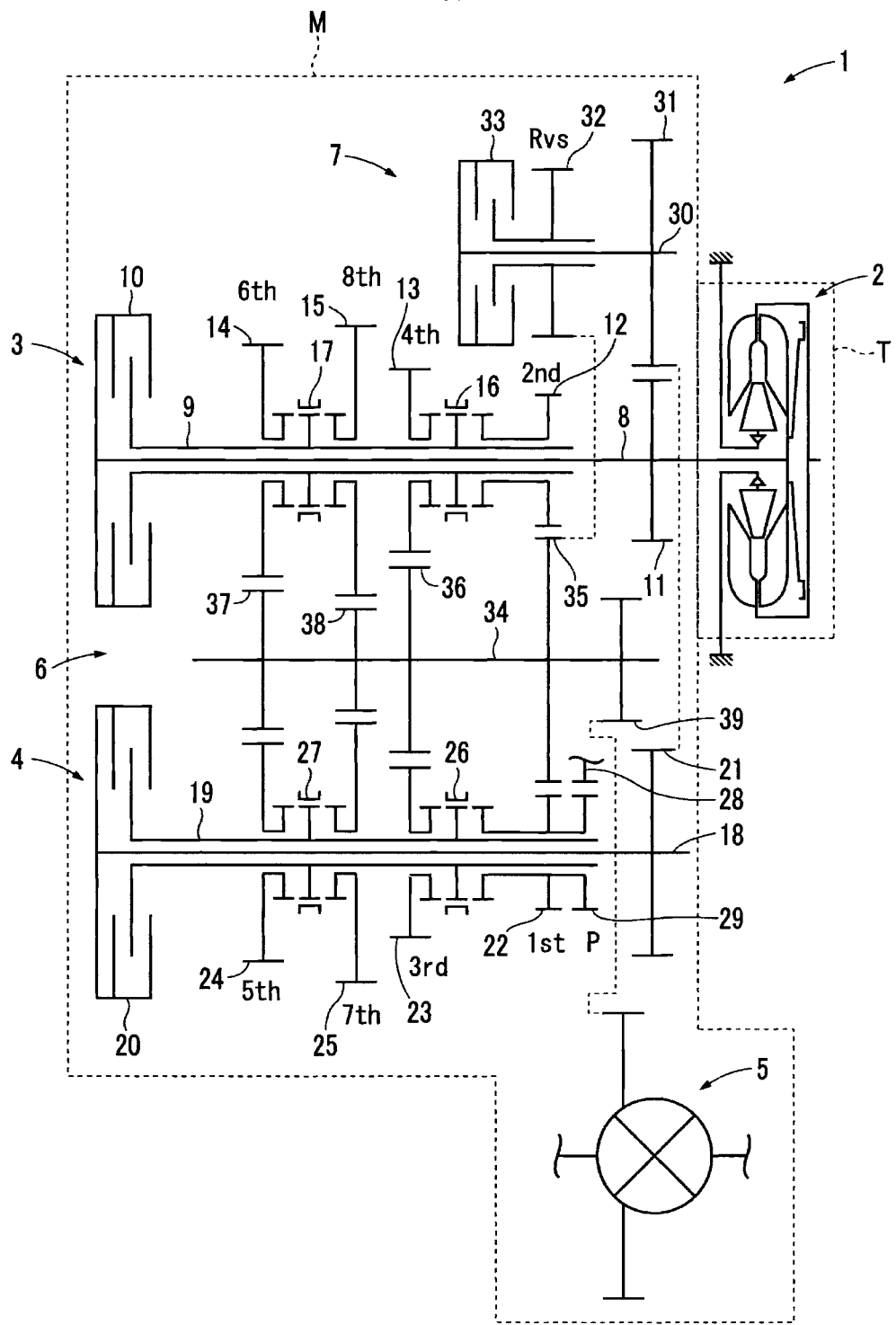
FIG. 1 is a skeleton diagram of a transmission according to an embodiment of the present invention.

The following will describe an embodiment of the present invention with reference to the accompanying drawings. As illustrated in FIG. 1, a transmission 1 to which the lubricating structure according to an embodiment of the present invention is a twin clutch type transmission which uses two clutches for engaging/disengaging odd-numbered stages and even-numbered stages.

The transmission 1 has a torque converter 2 for transmitting a motive power input from a prime mover through the intermediary of a fluid, an even-numbered stage speed changer 3 which shifts the motive power from the torque converter 2 to an even-numbered stage, an odd-numbered stage speed changer 4 which shifts the motive power from the torque converter 2 to an odd-numbered stage, an output section 6 which outputs the motive power from each gear shift stage received from the even-numbered stage speed changer 3 and the odd-numbered stage speed changer 4 to a differential gear 5, and a reverse speed changer 7 which shifts the motive power from the torque converter 2 to a reverse power.

The case which accommodates the transmission 1 is configured from a first case T and a second case M. The first case T houses the torque converter 2 coupled to the prime mover. The second case M houses the even-numbered stage speed changer 3, the odd-numbered stage speed changer 4, the reverse speed changer 7, and the differential gear 5.

The even-numbered stage speed changer 3 has a first input shaft 8 connected to the output end of the torque converter 2, a first auxiliary input shaft 9 rotatably supported by the first input shaft 8 on a coaxial line, and a first clutch 10 capable of switching between an engagement mode, in which the motive power of the first input shaft 8 is transmitted to the first auxiliary input shaft 9, and a disengagement mode, in which the transmission is shut off. The first clutch 10 is positioned at an end opposite from the torque converter 2 of the first input shaft 8 and the first auxiliary input shaft 9.

The first input shaft 8 is provided with an idle drive gear 11 for transmitting motive power to the reverse speed changer 7 and the odd-numbered stage speed changer 4. The first auxiliary input shaft 9 is provided with a 2nd-speed drive gear 12, a 4th-speed drive gear 13, a 6th-speed drive gear 14, and an 8th-speed drive gear 15 for transmitting the motive power related to even-numbered gear shift stages of a 2nd speed, a 4th speed, a 6th speed, and an 8th speed, respectively.

The first auxiliary input shaft 9 is further provided with a 2nd-4th speed synchromesh mechanism 16, which selectively connects the 2nd-speed drive gear 12 and the 4th-speed drive gear 13 to the first auxiliary input shaft 9, and a 6th-8th speed synchromesh mechanism 17, which selectively connects the 6th-speed drive gear 14 and the 8th-speed drive gear 15 to the first auxiliary input shaft 9.

The odd-numbered stage speed changer 4 is provided with a second input shaft 18 provided in parallel to the first input shaft 8, a second auxiliary input shaft 19 rotatably supported by the second input shaft 18 on the coaxial line, and a second clutch 20 capable of switching between the engagement mode, in which the motive power of the second input shaft 18 is transmitted to the second auxiliary input shaft 19, and the disengagement mode in which the transmission is shut off. The first clutch 10 and the second clutch 20 are wet type.

The second input shaft 18 is provided with an idle driven gear 21, and motive power is input thereto through the intermediary of the idle driven gear 21. The second auxiliary input shaft 19 is provided with a 1st-speed drive gear 22, a 3rd-speed drive gear 23, a 5th-speed drive gear 24, and a 7th-speed drive gear 25 for transmitting the motive power related to odd-numbered gear shift stages of a 1st speed, a 3rd speed, a 5th speed, and a 7th speed, respectively.

The second auxiliary input shaft 19 is further provided with a 1st-3rd speed synchromesh mechanism 26, which selectively connects the 1st-speed drive gear 22 and the 3rd-speed drive gear 23 to the second auxiliary input shaft 19, and a 5th-7th speed synchromesh mechanism 27, which selectively connects the 5th-speed drive gear 24 and the 7th-speed drive gear 25 to the second auxiliary input shaft 19. The second auxiliary input shaft 19 is further provided with a parking gear 29, which is secured to the 1st-speed drive gear 22 and meshes with a parking pole 28 at the time of parking thereby to prevent the 1st-speed drive gear 22 from rotating.

The reverse speed changer 7 includes an idle shaft 30 provided in parallel to the first input shaft 8, an idle gear 31 secured to the idle shaft 30, a reverse gear 32 rotatably supported by the idle shaft 30 on a coaxial line, and a reverse clutch 33 capable of switching between the engagement mode, in which the motive power of the idle shaft 30 is transmitted to the reverse gear 32, and the disengagement mode, in which the transmission is shut off.

The idle gear 31 meshes with the idle drive gear 11 and the idle driven gear 21 to transmit the motive power of the idle drive gear 11 to the idle shaft 30 and the idle driven gear 21. The reverse gear 32 transmits reverse motive power to the output section 6 at the time of moving backward.

The output section 6 includes an output shaft 34 provided in parallel to the first input shaft 8, a 1st speed/2nd speed/reverse driven gear 35, a 3rd speed/4th speed driven gear 36, a 5th speed/6th speed driven gear 37, a 7th speed/8th speed driven gear 38, and a last drive gear 39, which are secured to the output shaft 34. The 1st speed/2nd speed/reverse driven gear 35 meshes with the 1st-speed drive gear 22, the 2nd-speed drive gear 12, and the reverse gear 32 to transmit the motive power of these gears to the output shaft 34.

The 3rd speed/4th speed driven gear 36 meshes with the 3rd-speed drive gear 23 and the 4th-speed drive gear 13 to transmit the motive power of these gears to the output shaft 34. The 5th speed/6th speed driven gear 37 meshes with the 5th-speed drive gear 24 and the 6th-speed drive gear 14 to transmit the motive power of these gears to the output shaft 34. The 7th speed/8th speed driven gear 38 meshes with the 7th-speed drive gear 25 and the 8th-speed drive gear 15 to transmit the motive power of these gears to the output shaft 34. The last drive gear 39 transmits the motive power, which has been transmitted to the output shaft 34, to the differential gear 5.

To establish the 1st speed in the transmission 1, the 1st-3rd speed synchromesh mechanism 26 connects the 1st-speed drive gear 22 to the second auxiliary input shaft 19 beforehand. Thereafter, when the accelerator pedal of a vehicle in which the transmission 1 has been installed is depressed, the second clutch 20 is set in the engagement mode. However, the first clutch 10 and the reverse clutch 33 remain in the disengagement mode.

As a result, the motive power to be transmitted to the first input shaft 8 through the intermediary of the torque converter 2 is transmitted to the differential gear 5 through the intermediary of the idle drive gear 11, the idle gear 31, the idle driven gear 21, the second input shaft 18, the second clutch 20, the second auxiliary input shaft 19, the 1st-3rd speed synchromesh mechanism 26, the 1st-speed drive gear 22, the 1st speed/2nd speed/reverse driven gear 35, the output shaft 34, and the last drive gear 39.

To switch between an odd-numbered stage and an even-numbered stage, one of the 1st-speed to the 8th-speed drive gears of either 12 to 15 or 22 to 25 to be used as the new gear shift stage is connected to the first auxiliary input shaft 9 or the second auxiliary input shaft 19 beforehand by the 1st-3rd speed synchromesh mechanism 26, the 2nd-4th speed synchromesh mechanism 16 or the 5th-7th speed synchromesh mechanism 27 or the 6th-8th speed synchromesh mechanism 17 that corresponds to the selected speed drive gear, and the selected speed drive gear is placed in a standby mode. Then, when a switching timing is reached, the switching between the engagement mode and the disengagement mode in the first clutch 10 and the second clutch 20 is carried out.

For example, to switch from the 1st speed to the 2nd speed, the 2nd-speed drive gear 12 is connected in advance to the first auxiliary input shaft 9 by the 2nd-4th speed synchromesh mechanism 16. Then, when the switching timing is reached, the second clutch 20 is switched from the engagement mode to the disengagement mode, while the first clutch 10 is switched from the disengagement mode to the engagement mode. This accomplishes the changeover to the 2nd speed, causing the motive power of the first input shaft 8 to be transmitted to the differential gear 5 through the intermediary of the 2nd-speed drive gear 12.

A reverse mode is established by setting the reverse clutch 33 to the engagement mode. A parking mode is established by setting the parking gear 29 and the parking pole 28 in an engaged state.

Thus, in the transmission 1, a speed change is accomplished by making the synchromesh mechanism of a disengaged-side transmission path of an even-numbered stage or an odd-numbered stage gear to in-gear (pre-shift) and then switching the connection from the first clutch 10 to the second clutch 20 or vice versa. This arrangement minimizes the time required for completing a speed change and also minimizes a shock due to a speed change.

However, the first clutch 10 and the second clutch 20 are subjected to heat load when the switching between the engagement mode and the disengagement mode is repeated. Hence, a sufficient amount of lubricating oil must be supplied to the clutches.

Figure 2:
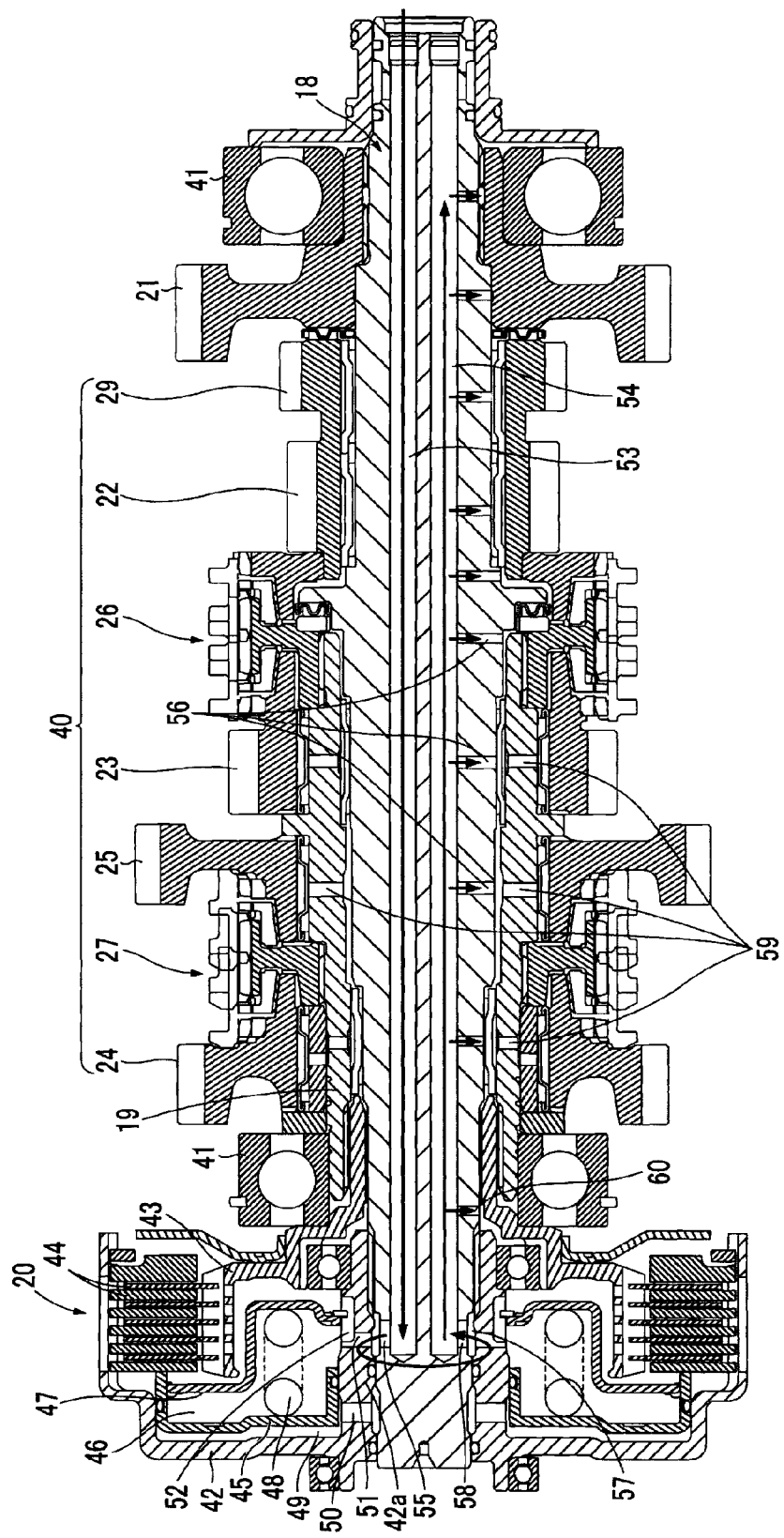
FIG. 2 is a sectional diagram illustrating an odd-numbered stage speed changer in FIG. 1.

FIG. 2 is a cross-sectional view of the odd-numbered stage speed changer 4. As is shown in FIG. 2, a transmission mechanism 40 configured from the 1st-speed drive gear 22, the 3rd-speed drive gear 23, the 5th-speed drive gear 24, the 7th-speed drive gear 25, the 1st-3rd speed synchromesh mechanism 26, the 5th-7th speed synchromesh mechanism 27 and the like, is provided rotatably and concentric to the second input shaft 18, about the second input shaft 18.

The transmission mechanism 40 is provided on the second input shaft 18 via the second auxiliary input shaft 19 as an intermediate shaft. As such, the transmission mechanism 40 is transmitted with the motive power of the second input shaft 18 via the second auxiliary input shaft 19 when the second clutch 20 is in the engagement mode, and is not transmitted with the motive power when the second clutch 20 is in the disengagement mode.

The second input shaft 18 and the second auxiliary input shaft 19 are supported with the idle driven gear 21 side directed toward the first case T (refer to FIG. 1) side, by the second case M (refer to FIG. 1) via a bearing 41.

The second clutch 20 is equipped with a clutch drum 42 as an input member fixed to an end portion of the second input shaft 18, and a clutch hub 43 as an output member fixed to the second auxiliary input shaft 19. An end portion of the clutch hub 43 opposite to the clutch drum 42 is fixed to an end portion of the second auxiliary input shaft 19 at the second clutch 20 side. The transmission mechanism 40 is arranged from the fixed portion of the second auxiliary input shaft 19 with the clutch hub 43 to the idle driven gear 21 side.

A plurality of friction-engaging elements 44, that closely contacts each other when the second clutch 20 is in the engagement mode, and that depart from one another when the second clutch 20 is in the disengagement mode, intervenes between the clutch drum 42 and the clutch hub 43. Further, a piston 45 for closely contacting the friction-engaging element 44, and a partition member 47 which defines a canceller chamber 46 between an inner wall of the piston, are provided at an inner side of the clutch drum 42. A spring 48 which pushes back the piston 45 in a direction departing the friction-engaging element 44 is provided between the partition member 47 and the piston 45.

The clutch drum 42 is fixed to the second input shaft 18, by fitting an inner peripheral portion 42*a* to an exterior of the end portion of the second input shaft 18. An operation oil hole 50 for introducing a hydraulic oil to a hydraulic oil chamber 49 between the clutch drum 42 and the piston 45, a cancel oil hole 51 for introducing a lubricating oil as a cancel oil to a canceller chamber 46, and a leakage groove 52 for flowing the lubricating oil introduced to the canceller chamber 46 towards the friction-engaging element 44, are provided to the inner peripheral portion 42*a*.

The second input shaft 18 includes a first oil passage 53 which extends in the second input shaft 18 from one end of the second input shaft 18 to a first position corresponding to a position of the second clutch 20, and a second oil passage 54 which extends in the second input shaft 18 from the first position to a second position corresponding to a position of the transmission mechanism 40. The second position includes a position from the position of the 5th-speed drive gear 24 to the 1st-speed drive gear 22.

The second input shaft 18 is provided with a first lubrication hole 55 which penetrates from an inner circumferential surface of the first oil passage 53 to an outer circumferential surface of the second input shaft 18 for distributing the lubricating oil to the second clutch 20 at the first position, and a plurality of second lubrication hole 56 which penetrates from an inner peripheral surface of the second oil passage 54 to the outer peripheral surface of the second input shaft 18 for distribution the lubricating oil to the transmission mechanism 40 at the second position.

Further, a circulating oil passage 57 which circles an outer periphery of the second input shaft 18 is provided between the second input shaft 18 and the inner circumferential portion 42*a* of the clutch drum 42 corresponding to the position of the first lubrication hole 55. A radially-outside end of the first lubrication hole 55 is opened at the circulating oil passage 57. Further, a communicating oil hole 58 which communicates from the circulating oil passage 57 to the second oil passage is provided at a position of the circulating oil passage 57 of the second input shaft 18.

A flow path which passes the first lubrication hole 55, the circulating oil passage 57, the cancel oil hole 51, the canceller chamber 46, the cancel oil hole 51, the circulating oil passage 57, and the communicating oil hole 58 in this order, or a flow path which passes, without passing the canceller chamber 46, the first lubrication hole 55, the circulating oil passage 57 and the communicating oil hole 58 in this order, constitutes a connecting oil passage which connects the first oil passage 53 and the second oil passage 54 at the first position.

The second auxiliary input shaft 19 is provided with a plurality of third lubrication hole 59, at positions corresponding to each second lubrication hole 56. The third lubrication hole 59 supplies the lubricating oil distributed through the second lubrication hole 56, to the 3rd-speed drive gear 23, the 5th-speed drive gear 24, and the 7th-speed drive gear 25 supported on the second auxiliary input shaft 19, the bearings supporting the same, the 1st-3rd speed synchromesh mechanism 26, the 5th-7th speed synchromesh mechanism 27, and the like.

A part of the second lubrication hole 56 distributes the lubricating oil to the 1st-speed drive gear 22, the bearing 41 and the like, without intervening the third lubrication hole 59. Further, in the second oil passage 54, a lubrication hole 60 is opened at a portion where the inner circumferential portion 42a of the clutch drum 42 and the clutch hub 43 are next to one another, as a first lubrication hole from the communicating oil hole 58. The opening communicates towards the friction-engaging element 44, through the intermediary of between the clutch drum 42 and the clutch hub 43.

Although not appearing in FIG. 2, a third oil passage for supplying the hydraulic oil to the hydraulic oil chamber 49, in addition to the first oil passage 53 and the second oil passage 54, is formed in the second input shaft 18 from an end portion of the second input shaft 18 on the idle driven gear 21 side to a position corresponding to the hydraulic oil hole 50. The hydraulic oil hole 50 communicates with the third oil passage, and flows the hydraulic oil supplied via the third oil passage into the hydraulic oil chamber 49.

In this configuration, when the lubricating oil is supplied to the second clutch 20 and the transmission mechanism 40, the lubricating oil is supplied from a hydraulic pump provided to the first case T, via an oil passage provided to the case T, to an end portion of the first oil passage 53 on the first case T side. When the supplied lubricating oil reaches the end portion of the first oil passage 53 on the second clutch 20 side (the first position), the lubricating oil flows into the canceller chamber 46 from the first lubrication hole 55 through the intermediary of the circulating oil passage 57, and fills the canceller chamber 46.

The residual lubricating oil that could not flow into the canceller chamber 46, or the lubricating oil returned from the canceller chamber 46, flows into the second oil passage 54 from the circulating oil passage 57 through the intermediary of the communicating oil hole 58. The lubricating oil flown into the second oil passage 54 is first distributed to the lubrication hole 60, and is supplied for lubricating the friction-engaging element 44 and the like. Thereafter, the lubricating oil is sequentially distributed to each second lubrication hole 56, and further supplied for lubricating the transmission mechanism 40 and the like via the third lubricating hole 59 of the second auxiliary input shaft 19.

As is explained above, according to the present embodiment, the lubricating oil supplied to the first oil passage 53 is first distributed to the canceller chamber 46 and the friction-engaging element 44 of the second clutch 20, so that the lubricating oil may be filled as the cancel oil to the canceller chamber 46 promptly regardless of the revolving speed of the second input shaft 18, and the lubricating oil may be supplied stably to the second clutch 20.

Further, the lubricating oil is supplied from the first case T side housing the torque converter 2, so that there is no need to provide an oil passage in the second case M. To that extent, the total length of the transmission 1 may be shortened, and the weight may be lightened, as well as the oil passage to the second clutch 20 may be shortened, and the lubricating structure may be simplified.

Further, in the first oil passage 53, no opening such as a lubrication hole is present until the first lubrication hole 55 for supplying the lubricating oil to the second clutch 20. Therefore, even in the case where the transmission 1 is left for a long time without being driven, the lubricating oil is suppressed from running out of the first oil passage 53, and it becomes possible to fill the lubricating oil to the canceller chamber 46 immediately after driving of the transmission 1 after being unattended for a long time.

Further, the lubricating oil flown into the second oil passage 54 is first supplied for lubricating the friction-engaging element 44 and the like from the lubrication hole 60, so that the supply of lubricating oil to the second clutch 20 may be stabilized further.

What is claimed is:
1. A lubricating structure of a transmission, comprising:
an input shaft which is input with a motive power from a prime mover;
a transmission mechanism provided rotatably and concentric to the input shaft;
a clutch which is capable of freely switching between an engagement mode in which the motive power input to the input shaft to the transmission mechanism is transmitted, and to a disengagement mode in which the transmission is shut off;
a first oil passage extending in the input shaft from one end thereof to a first position corresponding to a position of the clutch, and which is supplied with lubricating oil;
a second oil passage extending in the input shaft from the first position to a second position corresponding to a position of the transmission mechanism; and
a connecting oil passage which connects the first oil passage and the second oil passage at the first position,
wherein the input shaft is provided with a first lubrication hole which pierces an inner circumferential surface of the first oil passage to an outer peripheral surface of the input shaft for distributing the lubricating oil to the clutch at the first position, and a second lubrication hole which pierces an inner circumferential surface of the second oil passage to an outer peripheral surface of the input shaft for distributing the lubricating oil to the transmission mechanism at the second position,
and the one end of the first oil passage is configured to connect to a lubricating oil source.
2. The lubricating structure of a transmission according to claim 1, comprising an intermediate shaft arranged to the outer peripheral side of the input shaft, and which is provided rotatably and concentric to the input shaft,
wherein the transmission mechanism is arranged on the intermediate shaft,
the supply of the lubricating oil to the first oil passage is performed from a case of the transmission,
an input member of the clutch is arranged on an end portion of another end side of the input shaft,
an output member of the clutch is fixed to an end portion of the clutch side of the intermediate shaft, and
the transmission mechanism is arranged on the intermediate shaft between the end portion of the clutch side and another side thereof.

3. The lubricating structure of a transmission according to claim 2, wherein the case is equipped with
   a first case coupled to the prime mover, and
   a second case coupled to the first case and which accommodates the transmission mechanism,
   wherein the input shaft and the intermediate shaft are supported by the second case so that prime mover sides of the input shaft and the intermediate shaft face the first case side, and
   the supply of the lubricating oil to the first oil passage is performed from the first case.

* * * * *